UNITED STATES PATENT OFFICE.

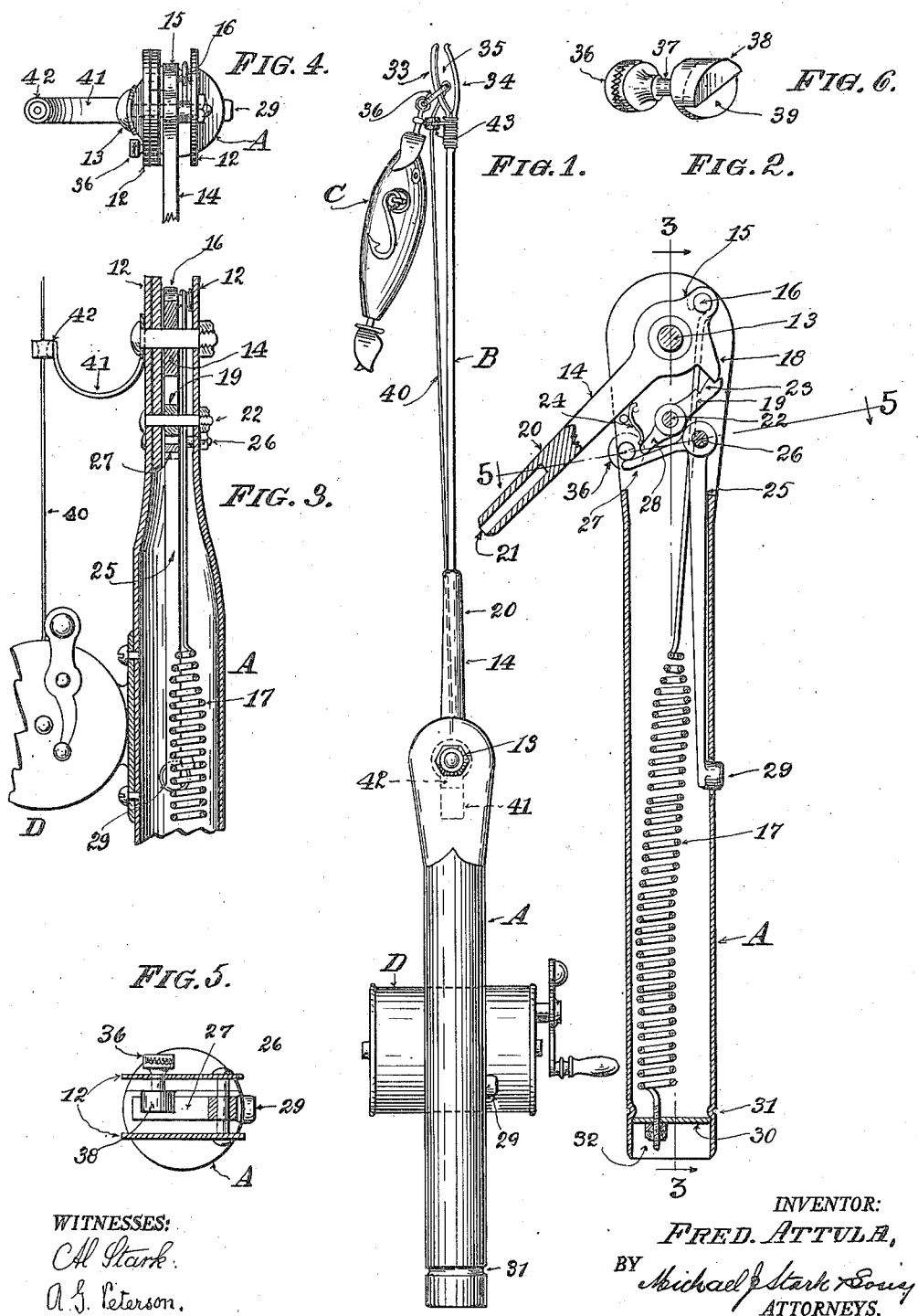

FREDERIC ATTULA, OF CHICAGO, ILLINOIS.

MECHANICAL BAIT-CASTING FISHING-ROD.

1,226,162. Specification of Letters Patent. Patented May 15, 1917.

Application filed March 8, 1917. Serial No. 153,500.

*To all whom it may concern:*

Be it known that I, FREDERIC ATTULA, a subject of the German Empire, and a resident of the city of Chicago, in the county of Cook and State of Illinois, have invented a certain new and useful Improvement in Mechanical Bait-Casting Fishing-Rods; and I do hereby declare that the following description of my said invention, taken in connection with the accompanying sheet of drawing, forms a full, clear, and exact specification, which will enable others skilled in the art to which it appertains to make and use the same.

My invention relates generally to improvements in fishing rods, and it consists, essentially, in the novel and peculiar combination of parts and details of construction, as hereinafter first fully set forth and described and then pointed out in the claims.

The object of this invention is the production of an efficient, serviceable, compact, and convenient fishing rod wherewith is combined mechanically operating means for casting the bait by simply holding the device in one hand and then pushing a button or trigger to release the rod and throw the bait.

Another object of this invention is a mechanically operating bait casting device in which the force of the throw of the bait, and consequently the distance to which the bait may be projected, may be varied by a simple manipulation of the rod. And a further object of this invention is the production of a mechanically operating bait casting device which, after it has been set for operation, can be locked in operative position so that an accidental casting of the bait is prevented to avoid possible accidents and injury to the fisherman.

In order to accomplish these desirable objects, I construct this fishing rod as shown in the drawings forming part of this specification, and in which Figure 1 is an elevation of the complete fishing rod embodying my invention. Fig. 2 is a sectional elevation of the same, the reel being omitted. Fig. 3 is a sectional elevation of a portion of the fishing rod, on line 3—3 of Fig. 2. Fig. 4 is a plan of the device. Fig. 5 is a sectional detail on line 5—5 of Fig. 2. Fig. 6 is a perspective view of the locking mechanism.

Like parts are designated by the same characters and symbols of reference in all the figures.

A, in the drawings designates the handle of the rod wherein is located and mounted the mechanism by which the rod B, is operated to cast the bait C. This handle is, preferably, a metallic tube, the upper end of which is flattened, as at 12, the two walls being in parallel spaced relationship. In the space between these walls 12 there is pivoted, upon a bolt 13, a lever 14, which lever has a short arm 15, which carries a pin 16, to which a long spring 17, is hooked. This lever has, furthermore, a sidewise projecting arm 18, wherewith engages a dog 19, when the rod is set for casting the bait C, as will hereinafter appear.

The long arm 20 of the lever 14 is internally bored at its outer end, as at 21, and into this bore the rod B is inserted and held therein by frictional contact. The dog 19 is pivoted upon a pivot bolt 22, one arm of said dog having a multiplicity of V-shaped notches 23, one of which may be engaged by the arm 18 on the lever 14, a preferably blade spring 24, acting upon said dog, being provided, to effect this engagement.

In the flattened head of the handle A, there is, furthermore, pivoted a bell crank lever 25, upon a pivot 26, the short arm 27, of this bell crank lever being constructed to bear upon the tail 26 of the dog 19, while the long arm of said bell crank lever carries at its end a button 29, projecting from the outer periphery of the handle A, and serving as a finger, or thumb piece to actuate the bell crank lever, whereby the latter serves as a trigger to release the dog from the arm 18, and thus to release the rod.

The lower end of the spring 17 passes through a button or plate 30, located near the lower end of the tube A, said plate bearing against inwardly pressed projections 31, on the handle A, locking nuts being in screw threaded engagement with the terminal of the spring 17, such as shown at 32 in Fig. 2, for adjustment of the tension of said spring, and at the same time retain the plate 30 in position. When these nuts 32 are removed from the end of the spring 17, and the hook at the upper end thereof disengaged from the pivot 16, the spring can be withdrawn from the tube through the lower end thereof, in case it shall be required to renew the same or for other purposes.

In order to properly suspend the bait C from the upper end of the rod B, there is formed at the upper end of the rod a slight curve 33, and in front of this curved portion there is located an oppositely curved, preferably resilient, element 34, which element may be a wire spring, thereby affording a partly closed space 35, wherein engages a ring 36, at the head of the bait, or the eye of a baited hook or the like, which ring may readily pass out of the space 35 when the bait is being cast.

In a mechanically operating bait casting device it is desirable when the rod has been set ready for casting, that this rod can be locked in this set position. Various devices may be employed to accomplish this object, such as is illustrated in Figs. 2, 4, 5, and 6.
A knurled button 36, on a shank 37, journaled in the walls of the flattened portion of the tube A, carries at its inner end a head 38, one half of which is cut away as at 39. This head 38 bears with its peripheral portion upon the short arm 27 of the trigger 25, as illustrated in Fig. 2, and thereby prevents the trigger from being operated, and the dog 19 from moving on its pivot; but when the button 36 is rotated so that the cut away portion 39 is opposite the short arm of the trigger, the latter is free to move upwardly toward the dog and lifting the tail 28 thereof causes the disengagement of the short arm 18, and the spring 17 to pull the short arm 15 on the lever 14 downwardly, thereby moving the rod D rapidly upward and by the velocity attained by this rapid movement cause the bait C to leave the end of the rod to be forwardly projected a distance depending upon the length of the rod, the weight of the bait, and the pulling force of the spring 17.

The bait C may be artificial or live bait attached to the end of the fish line 40, wound upon the reel D, which reel may be of any desired design or construction; and to properly guide this line 40, I form at the upper end of the head of the handle A, a preferably curved and resilient support 41, to receive a thimble 42, through which the line passes to a similar thimble 43, near the end of the rod B, and thence to the bait C.

In Fig. 1, I have illustrated this mechanically operating bait casting device in position ready for being set for operation. To set the same, the rod B is pulled down to the inclined position shown in Fig. 2, and is held in this position by one of the notches 19, engaging the arm 18 on the lever 14.
The fisherman, holding the device in one hand, then pushes the trigger, which liberates the rod B, and casts the bait in the manner heretofore described.

In order that the distance to which the bait may be thrown, may be varied, there are in the dog a number of notches 23, so that when the rod is only turned down far enough to cause the arm 18 to engage the notch 23 nearest the pivot bolt 22 of the dog, its rotative movement will be correspondingly lessened, and therefore, the distance through which the bait will be projected be likewise lessened.

Attention is directed to the fact that this device, when the rod B is removed from the lever 14, is of such small compass that it may be carried in a person's pocket. And it is obvious that the metallic handle may be covered with some such material as the usual cork, celluloid, etc., for convenience in handling the same, details which will readily suggest themselves to any person skilled in the art to which this invention appertains.

I have hereinbefore described the preferred embodiment of my invention, but I desire it to be distinctly understood that many of the details of construction disclosed, may be varied, and parts omitted without departing from the scope of my invention, as defined in the subjoined claims.

Having thus fully described this invention, I claim as new, and desire to secure to myself by Letters Patent of the United States—

1. A mechanical bait casting instrument, comprising a tubular handle, the upper end of said handle being flattened to afford a head having parallel walls, a lever pivoted in said head, said lever having a short arm provided with a pin, and a long arm bored at its end, there being on said lever a laterally projecting arm, a dog pivoted in said head, said dog having two members, there being a series of notches in the edge of one of said members, a bell crank pivotally mounted in said head, one arm of said bell crank bearing against the other member of said dog, and a tensioned spring in said handle, one end of said spring being connected to the aforementioned pin, the other end of said spring being connected to the lower end of said tubular handle.

2. In combination with an instrument of the nature described in claim 1, of a rod removably connected to said instrument, said rod having at one end a fork to engage bait to be cast by said instrument, one member of said fork being resilient.

3. The combination, with an instrument of the nature set forth in claim 1, of means whereby the trigger in the instrument by which the bait casting mechanism is liberated, may be locked when in operative position to prevent accidental discharge of the bait.

In testimony that I claim the foregoing as my invention, I have hereunto set my hand.

FREDERIC ATTULA.